(12) United States Patent
Borgs et al.

(10) Patent No.: US 9,367,879 B2
(45) Date of Patent: Jun. 14, 2016

(54) DETERMINING INFLUENCE IN A NETWORK

(71) Applicant: Microsoft Corporation, Redmond, WA (US)

(72) Inventors: Christian Herwarth Borgs, Boston, MA (US); Michael Avraham Brautbar, Philadelphia, PA (US); Jennifer Tour Chayes, Boston, MA (US); Brendan James Lucier, Cambridge, MA (US)

(73) Assignee: MICROSOFT CORPORATION, Redmond, WA (US)

( * ) Notice: Subject to any disclaimer, the term of this patent is extended or adjusted under 35 U.S.C. 154(b) by 451 days.

(21) Appl. No.: 13/629,978

(22) Filed: Sep. 28, 2012

(65) Prior Publication Data

US 2014/0095689 A1    Apr. 3, 2014

(51) Int. Cl.
| | |
|---|---|
| *G06F 15/173* | (2006.01) |
| *G06Q 50/00* | (2012.01) |
| *G06F 17/30* | (2006.01) |
| *G06Q 30/02* | (2012.01) |
| *G06Q 10/06* | (2012.01) |
| *G06Q 10/00* | (2012.01) |

(52) U.S. Cl.
CPC .......... *G06Q 50/01* (2013.01); *G06F 17/30958* (2013.01); *G06Q 10/00* (2013.01); *G06Q 10/06395* (2013.01); *G06Q 30/02* (2013.01)

(58) Field of Classification Search
None
See application file for complete search history.

(56) References Cited

U.S. PATENT DOCUMENTS

| | | | | |
|---|---|---|---|---|
| 7,991,841 B2 * | 8/2011 | Anderson | ............... | G06Q 30/02 709/205 |
| 8,185,558 B1 * | 5/2012 | Narayanan | ........ | G06F 17/30958 707/798 |
| 8,838,605 B2 * | 9/2014 | Muntz | ..................... | G06Q 10/00 707/737 |
| 2007/0260725 A1 * | 11/2007 | McCuller | ............... | G06Q 30/02 709/224 |
| 2007/0265870 A1 * | 11/2007 | Song | ..................... | G06Q 30/00 705/7.29 |
| 2008/0070209 A1 * | 3/2008 | Zhuang | .................. | G06Q 10/10 434/236 |
| 2009/0190729 A1 * | 7/2009 | Chakraborty | .......... | G06Q 10/00 379/112.01 |
| 2009/0192809 A1 * | 7/2009 | Chakraborty | .......... | G06Q 10/00 705/348 |
| 2009/0307057 A1 * | 12/2009 | Azout | .................... | G06Q 30/02 705/7.29 |
| 2010/0088130 A1 * | 4/2010 | Bonchi | ............ | G06Q 10/06395 705/7.41 |
| 2011/0055132 A1 * | 3/2011 | Mahdian | ................ | G06Q 10/00 706/46 |
| 2012/0254184 A1 * | 10/2012 | Choudhary | ............ | G06Q 50/01 707/738 |
| 2012/0317121 A1 * | 12/2012 | Fuchs | ............... | G06F 17/30958 707/741 |
| 2013/0046797 A1 * | 2/2013 | Muntz | ..................... | G06Q 10/00 707/803 |
| 2013/0124448 A1 * | 5/2013 | Soulie-Fogelman | ... | G06Q 50/01 706/52 |
| 2013/0346467 A1 * | 12/2013 | Rosu | ................. | G06F 17/30958 709/201 |

OTHER PUBLICATIONS

Newman, et al. "A Fast Monte Carlo Algorithm for Site or Bond Percolation", pp. 1-17, Santa Fe Institute, Jun. 27, 2001.*

* cited by examiner

*Primary Examiner* — Ranodhi Serrao
*Assistant Examiner* — James Fiorillo
(74) *Attorney, Agent, or Firm* — Alin Corie; Sandy Swain; Micky Minhas

(57) ABSTRACT

An influence maximization process efficiently identifies an influential set of nodes with which to seed a diffusion process using the transposition of a graph representing the network. This approach offers an acceptable tradeoff between runtime complexity and accurate approximation. In addition, using an approximation condition, the influence maximization process may be further tuned to dramatically reduce the computational complexity even more in certain circumstances while allowing a fallback to the unturned influence maximization process if the approximation condition is not satisfied.

20 Claims, 4 Drawing Sheets

DETERMINING INFLUENCE IN A NETWORK

BACKGROUND

In social networks, certain nodes (e.g., users, entities, etc.) influence other nodes for various reasons and by various degrees. For example, a prominent food critic on a micro-blogging service may profoundly influence the interests of his or her followers based on a posting that is critical of a particular restaurant. Such influence impacts not only nodes in the immediate proximity to the influencing node, but the influence can also propagate throughout the social network, with varying degrees of effectiveness.

Diffusion is a graph process that models such phenomena as the spread of information by word-of-mouth throughout a population. Diffusion can also be applied to understanding other phenomena, such as the spread of epidemic disease throughout a population. Generally, diffusion models the influence a particular node (e.g., a person) exerts on another node in a network and how that influence propagates to other nodes in the network.

Modern social networks define populations in which influence can be characterized using diffusion modeling. Understanding the ways in which influence can spread through such networks can be beneficial, for example, in advertising activities. A prominent application of diffusion modeling in a social network is a viral marketing campaign that aims to use a small number of targeted messages to initiate cascades of influence to create global increases in product adoption. To this end, it is helpful to identify those individuals who can exert the most influence within the social network and thereby maximize the proliferation of the messaging and the adoption of the product. However, the influence-maximization problem presents a significant computational challenge for predicting which individuals should be targeted with the messaging in order to maximize the magnitude of the resulting cascade, particularly in the context of constrained computational budgets and increasingly complex and continually growing networks.

SUMMARY

Implementations described and claimed herein address the foregoing problems by providing an influence maximization process that efficiently identifies an influential set of nodes with which to seed a diffusion process using a transposition of a graph representing the network. This approach offers an acceptable tradeoff between runtime complexity and accurate approximation. In addition, using an approximation condition, the influence maximization process may be further tuned to dramatically reduce the computational complexity even more in certain circumstances while allowing a fallback to the untuned influence maximization process if the approximation condition is not satisfied.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
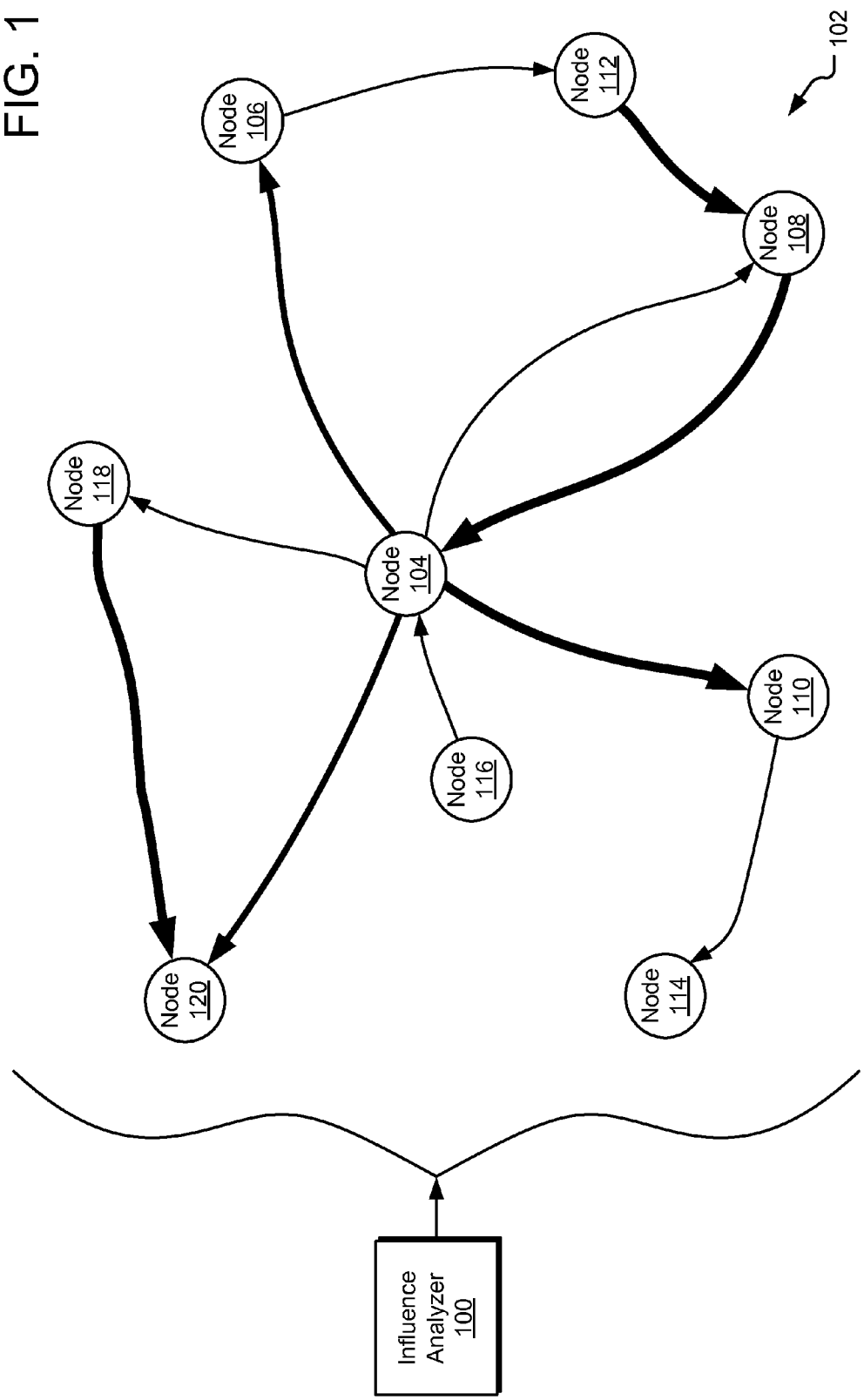
FIG. 1 illustrates an example influence analyzer evaluating a social network, wherein a directed graph represents the influence of various nodes within the social network.

FIG. 1 illustrates an example influence analyzer 100 evaluating a social network 102, wherein a directed graph represents the influence of various nodes within the social network 102. As an example of influence within the social network, consider a situation in which a micro-blogger (represented by a node 104) posts a message that includes a link to a review of a new product. The review may have been written by the micro-blogger or simply read and recommended by the micro-blogger. Others, known as "followers," follow the postings of the micro-blogger of node 104 and may have reviewed the posting and read the review linked to the posting. In FIG. 1, nodes 106, 108, 110, 118, and 120 represent followers of the micro-blogger of node 104

The relative thickness of the arcs from a first node to a second node represents the relative influence of the first node on the second node. For example, the node 104 has more influence on a node 106 than it does on a node 108, and the node 104 has even more influence on a node 110, where nodes 106, 108, and 110 may be referred to as "followers" of the node 104 (i.e., a follower is a node that can be influenced by the other node). It should also be understood that influence may be bi-directional, as shown between the nodes 104 and 108. As shown, the node 108 has more influence on the node 104 than the node 104 has on the node 108. Other nodes 112, 114, 116, 118, and 120 are also shown in the social network 102, although many others may also reside within the social network, exerting influence from other nodes and/or being influenced by other nodes.

In one implementation, the described technology determines the marginal influence of a node v in an edge-weighted directed graph as a metric that is proportional to the probability that the node v is influenced by a randomly chosen node u in the transposition of the edge-weighted directed graph. Although FIG. 1 depicts the relative influence of various nodes on other nodes, a problem statement relating to the described technology typically starts with unknown influences between nodes and attempts to the determine the relative influence of individual nodes on other nodes in the social network. It should also be understood that a spectrum of influence levels may be applied in the social network, and so the influence should not be limited to the three example discrete relative levels illustrated in FIG. 1.

Influence within a social network may be modeled using an independent cascade (IC) model. In an IC model, influence within a social network spreads via an edge-weighted directed graph $\mathcal{C}$. Influence begins at a set S of seed nodes of the social network and spreads through the social network in successive rounds. Upon first becoming influenced, each influenced node v has a single chance of influencing one or more of its neighbors u. Using notation, each directed edge $e=(v,u)$ has a weight $p_e \in [0,1]$ representing the probability that the process spreads along an edge e to a node u in the round following the round in which the node v was first influenced.

Using this notation, the graph $\mathcal{C}$ may be interpreted as a distribution over unweighted directed graphs, where each edge e is independently realized with probability $p_e$. Accordingly, if an unweighted graph G is realized according to this probability distribution, then the set of influenced nodes in the original process may be associated with the set of nodes reachable from the seed set S in an unweighted graph G. This alternative formulation is referenced in subsequent discussions of the IC model later in this disclosure.

Given weighted directed graph $\mathcal{G}$ and an integer k≥1, an influence maximization problem is to find a seed set S of at most k nodes maximizing the value of $E_{\mathcal{G}}[I(S)]$, which represents the expected influence of the seed set S of nodes in the graph $\mathcal{G}$. For β>1, a particular set of nodes T with |T|≤k is a 1/β-approximation to the influence maximization, if $$E_{\mathcal{G}}[I(T)] \geq \frac{\max_{S:|S|=k} E_{\mathcal{G}}[I(S)]}{\beta}$$

A primitive is used that realizes instances of the nodes influenced by a given vertex u in the weighted directed graph $\mathcal{G}$ and returns the set of influenced nodes. Conceptually, this approach is based on a realization the G~$\mathcal{G}$ and traversing $C_G(u)$, where $C_G(u)$ represents the set of nodes reachable from the seed set S of nodes in graph G.

Given a node u, a randomized depth first traversal in the directed, edge-weighted graph $\mathcal{G}$ can be executed in the weighted directed graph, starting at the node u. Before traversing a given edge e, a random traversal test is performed: with probability $p_e$, the edge e is traversed and, with a probability 1-$p_e$, the edge e is not traversed and is further removed from future consideration thereafter. The set of nodes traversed in this manner may be represented as $C_G(u)$ for G~$\mathcal{G}$, due to deferred randomness. The set of nodes of the directed graph G which have been traversed in accordance with this random depth-first traversal are returned as a result. This randomized depth first traversal can be executed in a runtime of the sum of the degrees (in $\mathcal{G}$) of the vertices in $C_G(u)$.

In one implementation of the described technology, the randomized depth first traversal is executed on a transpose graph $\mathcal{G}^T$, rather than $\mathcal{G}$, by following the in-links rather than the out-links in the tree traversal. In addition, the randomized depth-first traversal may be constrained by a threshold on the number of nodes traversed, such that the randomized depth-first traversal is aborted when the number of nodes visited during the traversal satisfies the threshold (e.g., meets or exceeds the threshold) and the resulting set of nodes visited prior to the traversal termination are returned.

In this context, $$a\left(1 - \frac{1}{e} - \varepsilon\right)$$

-approximation to the influence maximization problem may be computed, with a success probability of ⅔, in time O(mkε$^{-3}$ log n). In one implementation, the computational process may be described as two primary operations: (1) BuildHypergraph and (2) BuildSeedSet.

The first primary operation, BuildHypergraph, generates a sparse, randomized hypergraph representation $\mathcal{H}$ of the underlying graph $\mathcal{G}$ by repeatedly simulation the influence spread process on the transpose graph $\mathcal{G}^T$. In a manner similar to that described previously with regard to the randomized depth-first traversal of the graph $\mathcal{G}$, the BuildHypergraph operation starts at a random node u and proceeds with a randomized depth-first traversal of the transpose graph $\mathcal{G}^T$, where each encountered edge e is traversed independently with a probability of $p_e$. The set of nodes visited during the randomized depth-first traversal define an edge in $\mathcal{H}$. The BuildHypergraph operation receives as input a threshold R on its runtime. Once R nodes have been visited in one or more iterations of the randomized depth-first traversal, the traversal is terminated and the visited nodes are returned as the resulting hypergraph $\mathcal{H}$ of the BuildHypergraph operation.

The second primary operation, BuildSeedSet, uses the hypergraph $\mathcal{H}$ to construct an output set of highly influential nodes in the social network. In one implementation, the BuildSeedSet operation evaluates the nodes of the hypergraph $\mathcal{H}$, selecting the node with the highest degree in the hypergraph $\mathcal{H}$, removing the selected node and its incident edges from the hypergraph $\mathcal{H}$, and repeating the process on the modified hypergraph $\mathcal{H}$ until a desired number (e.g., k) of influencing nodes have been selected. The set of k selected nodes represents the generated seed set.

Figure 2:
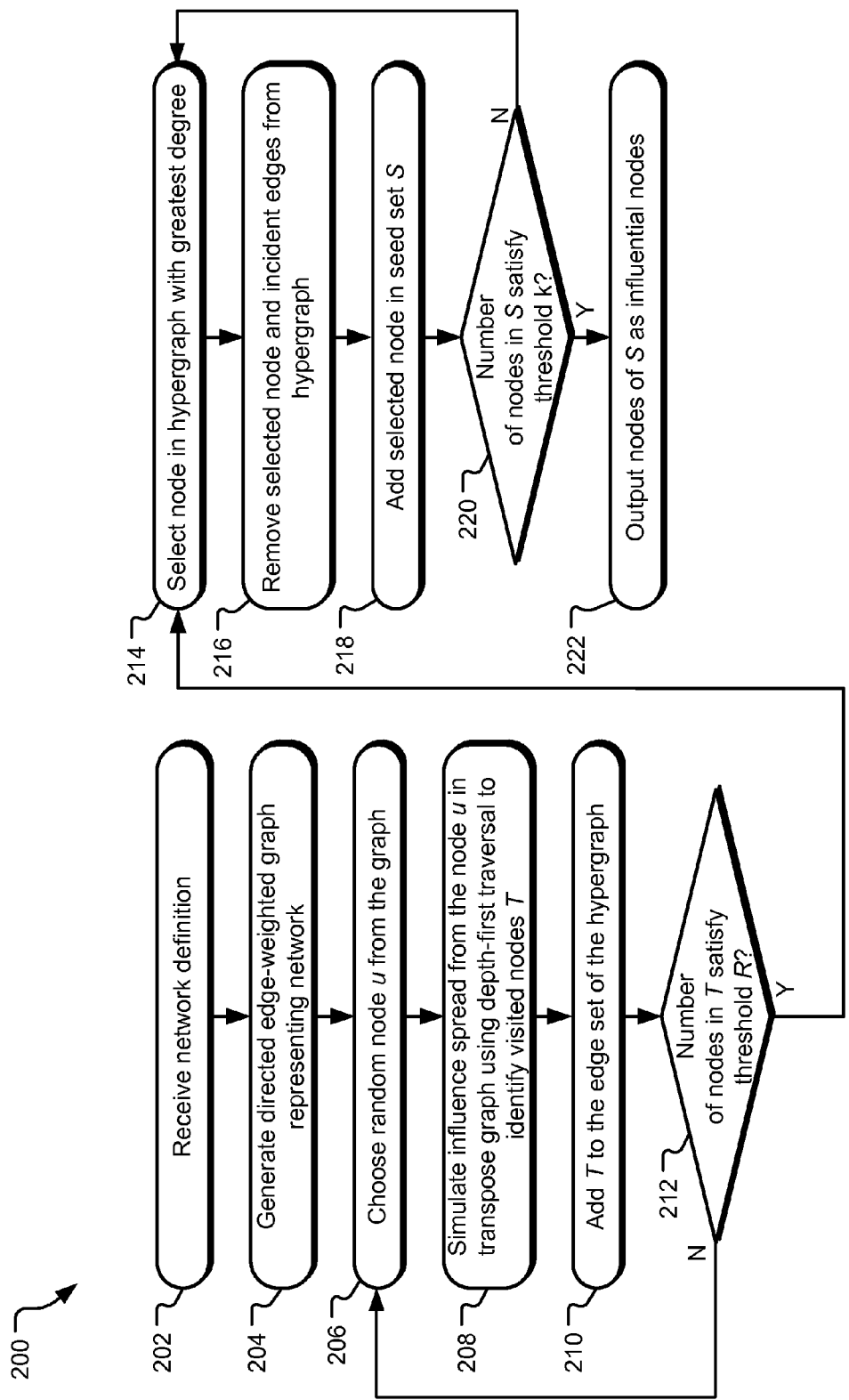
FIG. 2 illustrates example operations for evaluating influence within a network.

FIG. 2 illustrates example operations 200 for evaluating influence within a network. A receiving operation 202 receives a network definition, which provides information sufficient to develop a directed graph representing the network. For example, in a social network, the network definition may include a listing of social network members and their followers. Other network definitions may include alternative information. For example, in an epidemiological analysis, the network may include individuals and/or populations and their physical contacts with other individuals/populations. A generation operation 204 uses the network definition to generate a directed, edge-weighted graph representing the network. The weights represent the relative influence of one node on another. There are various methods of determines weights between nodes. In one example, a weight may be estimated based on the number of times one node makes reference to content of another node (e.g., via a retweet, a link, a "Like", etc.).

A node selection operation 206 selects a random node u from the graph $\mathcal{G}$. In one implementation, the node selection operation 206 selects a node u from the set of all nodes in $\mathcal{G}$, with every node having an equal probability of being selected. If the visited node is selected (e.g., node u), then a simulation operation 208 performs a depth-first traversal from the node u over the transpose graph $\mathcal{G}^T$. A building operation 210 adds each node T visited during the traversal to the edge set of a hypergraph $\mathcal{H}$.

In one implementation, the simulation operation 210 terminates when the total number of visited nodes added to the hypergraph $\mathcal{H}$ satisfies a traversal termination condition (e.g., meets or exceeds the threshold R). If the threshold is satisfied in this implementation, the traversal is terminated and processing proceeds to a hypergraph node selection operation 214. In another implementation, as shown in FIG. 2, the traversal operation 210 is allowed to complete its iteration and then the number of visited nodes is tested, such as shown in the decision operation 212. If the traversal termination condition is satisfied in this implementation, processed does not proceed to a new traversal in the simulation operation 210. Instead, processing proceeds to the hypergraph node selection operation 214. In either implementation, the traversal termination condition sets a budget for the number of nodes visited during the traversal such that the computational budget for the building of the hypergraph $\mathcal{H}$ is constrained.

The hypergraph node selection operation 214 traverses the hypergraph $\mathcal{H}$ to select the hypergraph node having the highest degree (e.g., the greatest number of incident edges). An extraction operation 216 extracts the selected node and its incident edges from the hypergraph $\mathcal{H}$. An addition operation 218 adds the selected node to a seed set S. A decision operation 220 determines whether the number of nodes in the seed set S satisfies a hypergraph node selection condition k (e.g., meets or exceeds a parameter k). If not, another iteration of processing returns to the hypergraph node selection operation 214. Otherwise, the hypergraph node selection iterations terminate and the selected nodes in the seed set S are output as the influential nodes of the network in an output operation 222.

Figure 3:
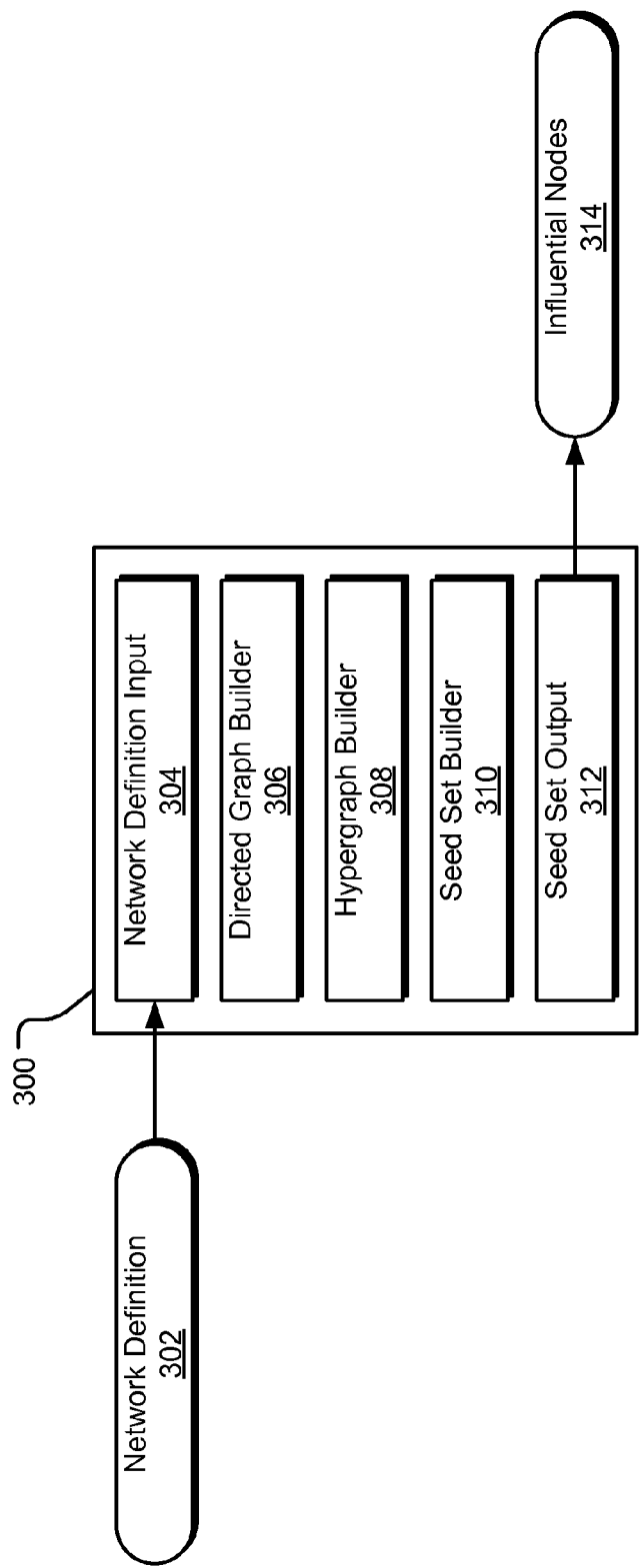
FIG. 3 illustrates an example influence evaluation system for evaluating influence within a network.

FIG. 3 illustrates an example influence evaluation system 300 for evaluating influence within a network. A network definition input interface 304 receives a network definition 302. A directed graph builder 306 builds an edge-weighted directed graph based on the network definition. A hypergraph builder 308 builds a hypergraph from the directed graph (e.g., by executing a process as described with regard to the BuildHypergraph operation). A seed set builder 310 builds a seed set of influential nodes from the hypergraph (e.g., by executing a process described with regard to the BuildSeedSet operation). A seed set output interface 312 outputs a set of influential nodes 314.

In one implementation, the influence evaluation process and system provides a tradeoff between runtime complexity and approximation quality. Given an arbitrary tradeoff condition (e.g., based on a tradeoff threshold $\beta$), the described technology provides a $\Theta(1/\beta)$-approximation to the influence maximization problem, in time $$O\left(\frac{n \cdot a(\mathcal{G}')\log^4(n)}{\sqrt{\beta}}\right).$$

where $a(\mathcal{G})$ represents the arboricity of graph $\mathcal{G}$, with probability of at least $\frac{2}{3}$.

Figure 4:
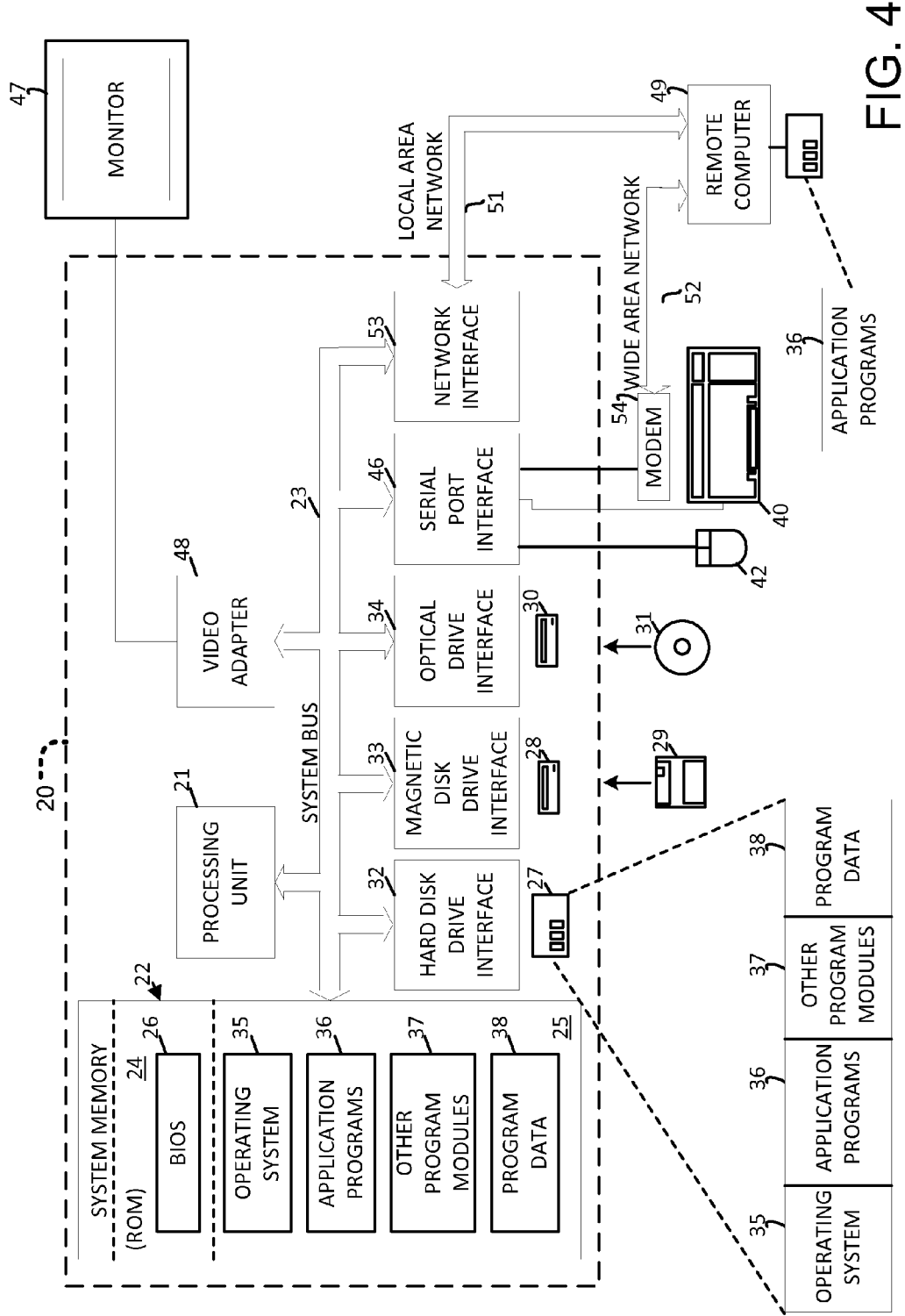
FIG. 4 illustrates an example system that may be useful in implementing the described technology.

FIG. 4 illustrates an example system that may be useful in implementing the described technology. The example hardware and operating environment of FIG. 4 for implementing the described technology includes a computing device, such as general purpose computing device in the form of a gaming console or computer 20, a mobile telephone, a personal data assistant (PDA), a set top box, or other type of computing device. In the implementation of FIG. 4, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide tangible nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, a touch screen, a natural user interface device (e.g., a gesture-detecting input) or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 4. The logical connections depicted in FIG. 4 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, circuitry or software/firmware instructions for controlling circuitry implementing interfaces, a directed graph builder, a hypergraph builder, a seed set builder, and other hardware/software blocks stored in memory 22 and/or storage devices 29 or 31 and processed by the processing unit 21. Network definitions, seed sets, graphs and hypergraphs, and other data may be stored in memory 22 and/or storage devices 29 or 31 as persistent datastores.

Some embodiments may comprise an article of manufacture. An article of manufacture may comprise a storage medium to store logic. Examples of a storage medium may include one or more types of tangible computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A device comprising: a processor; and
a memory coupled to the processor, the memory storing executable instructions operable by the processor, the executable instructions comprising a method for determining influence in a network, the method comprising:
receiving a communication from a computerized social network, wherein the communication comprises a network definition that defines a network of one or more members;
generating a directed edge-weighted graph representing the network based on the network definition, wherein one or more of the members are represented by one or more nodes in the directed edge-weighted graph and wherein a weight from the directed-weight graph represents an influence of one node on another node;
selecting a random node from the nodes in the directed edge-weighted graph;
simulating influence spread from the selected node using depth-first traversal;
building a hypergraph based on the nodes traversed during the simulation;
adding the traversed nodes to an edge set defining the hypergraph;
selecting the nodes in the edge set with highest number of incident edges;
removing the selected nodes and their corresponding incident edges from the hypergraph;
determining whether the number of selected nodes satisfies a hypergraph node selection condition; and
outputting the selected nodes as influential nodes of the network when the number of selected nodes satisfies the hypergraph node selection condition, wherein the computerized social network is enabled to identify members of the computerized social network based on the influential nodes.

2. The device of claim 1 wherein the method further comprises: transposing the directed edge-weighted graph to generate a transpose graph.

3. The device of claim 2, wherein building a hypergraph comprises:
generating the hypergraph from the transpose graph by performing one or more randomized depth-first traversals through the transpose graph.

4. The device of claim 3 wherein the method further comprises:
identifying a number of nodes visited during the one or more randomized depth-first traversals; and terminating the depth-first traversals responsive to the number of nodes visited satisfying a traversal termination condition.

5. The device of claim 4, wherein the method further comprises analyzing nodes in the hypergraph to determine which nodes have highest number of incident edges.

6. The device of claim 5, wherein analyzing nodes in the hypergraph further comprises:
traversing the generated hypergraph; and
selecting from the generated hypergraph the one or more nodes having greatest degree as compared to other nodes in the generated hypergraph.

7. The device of claim 6 wherein the method further comprises:
determining whether the number of traversed nodes satisfies a traversal termination condition.

8. The device of claim 7 wherein the method further comprises:
terminating the traversal when the number of traversed nodes satisfies a traversal termination condition.

9. The device of claim 8 wherein the method further comprises:
continuing the traversal of nodes if the number of traversed nodes does not satisfy a traversal termination condition.

10. A method comprising:
receiving by a device in communication with a computerized social network, a network definition that defines a network of one or more members;
generating a directed edge-weighted graph representing the network based on the network definition, wherein one or more of the members are represented by one or more nodes in the directed edge-weighted graph and wherein a weight from the directed edge-weighted graph represents an influence of one node on another node;
selecting a random node from the one or more nodes in the directed edge-weighted graph;
simulating influence spread from the selected node using one or more depth-first traversals;
building a hypergraph based on the nodes traversed during the simulation;
adding the traversed nodes to an edge set defining the hypergraph;
selecting the nodes in the edge set with highest number of incident edges;
removing the selected nodes and their corresponding incident edges from the hypergraph;
determining whether the number of selected nodes satisfies a hypergraph node selection condition; and
outputting the selected nodes as influential nodes of the network when the number of selected nodes satisfies the hypergraph node selection condition, wherein the computerized social network is enabled to identify members of the computerized social network based on the influential nodes.

11. The method of claim 10, further comprising analyzing nodes in the hypergraph to determine which nodes have highest number of incident edges.

12. The method of claim 11, wherein analyzing nodes in the hypergraph comprises:
traversing the hypergraph; and
selecting from the hypergraph one or more nodes having greatest degree as compared to other nodes in the hypergraph.

13. The method of claim 12 further comprising:
determining whether the number of traversed nodes satisfies a traversal termination condition.

14. The method of claim 13 further comprising:
terminating the traversal when the number of traversed nodes satisfies a traversal termination condition.

15. The method of claim 13 further comprising:
continuing the traversal of nodes if the number of traversed nodes does not satisfy a traversal termination condition.

16. The method of claim 10 further comprising:
transposing the directed edge-weighted graph to generate a transpose graph, and
wherein building a hypergraph comprises building a hypergraph from the transpose graph by performing one or more randomized depth-first traversals through the transpose graph.

17. The method of claim 10 further comprising:
identifying a number of nodes visited during the one or more depth-first traversals; and
terminating the depth-first traversals responsive to the number of nodes visited satisfying a traversal termination condition.

18. An influence evaluation system comprising:
at least one processor; and
a memory coupled to the at least one processor and including instructions for the at least one processor, the instructions comprising a method for determining influence in a network, the method comprising:
receiving by a device in communication with a computerized social network, a network definition that defines a network of one or more members;
building a directed edge-weighted graph based on the network definition, wherein one or more members are represented by one or more nodes in the directed edge-weighted graph and a weight from the directed edge-weighted graph represents an influence of one node on another node;
building a hypergraph from the directed edge-weighted graph using a simulation of influence spread from a randomly selected node using depth-first traversal;
adding the traversed nodes to an edge set defining the hypergraph;
analyzing nodes in the hypergraph to determine which nodes have greatest degree as compared to other nodes;
selecting the nodes in the hypergraph with the greatest degree;
removing the selected nodes and their corresponding incident edges from the hypergraph;
determining whether the number of selected nodes satisfies a hypergraph node selection condition;
building a seed set of influential nodes from the hypergraph based on which nodes have greatest degree; and
outputting the set of influential nodes when the number of selected nodes satisfies the hypergraph node selection condition, wherein the computerized social network is enabled to identify members of the computerized social network based on the influential nodes.

19. The system of claim 18, wherein building the hypergraph comprises simulating influence spread from the randomly selected node using depth-first traversal.

20. The system of claim 19, wherein the method further comprising:
determining whether the number of traversed nodes satisfies a traversal termination condition; and terminating the traversal when the number of traversed nodes satisfies a traversal termination condition.

* * * * *